United States Patent Office 2,775,526
Patented Dec. 25, 1956

2,775,526

REFRACTORY MATERIAL

Leslie W. Austin, San Jose, and James C. Hicks, Menlo Park, Calif., assignors to Kaiser Aluminum & Chemical Corporation, Oakland, Calif., a corporation of Delaware No Drawing. Application December 18, 1951,
Serial No. 262,335

11 Claims. (Cl. 106—59)

This invention relates to a non-fused refractory material; and more particularly it relates to a process for making a fired refractory material suitable for use as a grain or aggregate in the preparation of refractory shaped articles, particularly to be applied in high temperature installations.

Many periclase or magnesia-containing refractories, and refractories containing both periclase grains and chrome grains or periclase grains and spinel grains have been known in the past; but with the advent of more advanced and improved metallurgical processes, for instance, in steel production, improvement in the refractories necessary to such processes is also important and desirable. The production of refractory articles, such as bricks, furnace linings or bottoms, etc., containing chromite, or chrome, grains or admixtures of periclase and chromite grains or spinel grains has proved advantageous in that the final refractory is improved, for instance, with respect to resistance to chemical attack, as compared with a refractory composed solely of periclase, for example. However, some disadvantages exist with respect to these mixtures of refractory grains. From an economic standpoint, or from the viewpoint of national self-sufficiency, it is necessary to husband refractory chromite resources more carefully because some of the available ore is friable, i. e. breaks down into undesirably small fragments upon crushing, and is not satisfactory for use as grain or aggregate, and the deposits of chromite ore of good characteristics are not inexhaustible. At the same time, chromite of any physical grade often exhibits the undesirable characteristic of swelling during heating and use of the refractory containing it, particularly in the presence of iron oxide.

It is an object of this invention to provide a composite refractory material, that is, a grain or aggregate, which exhibits very little, or substantially no, swelling during use, which has a high hot load strength, and from which there can be produced refractory articles exhibiting excellent thermal spalling resistance. It is a further object of this invention to provide a refractory material or materials which are useful in refractory compositions in which natural chromite grains have hitherto been used.

According to the present invention there is produced a nonfused refractory material comprising agglomerated intergrown crystals, in substantially uniform dispersion, of periclase, magnesioferrite and at least one second magnesia spinel such as magnesiochromite ($MgO \cdot Cr_2O_3$). In the magnesioferrite and in the second or other magnesia spinel, a part of the magnesia can be replaced or substituted by manganous oxide, ferrous oxide, zinc oxide, nickel oxide, cobalt oxide, or other bivalent spinel-forming metal oxide or spinel-forming oxide of a bivalent metal; and the higher valent metal oxide component, $Cr_2O_3$ etc., can be substituted at least in part by the oxide of aluminum, titanium, cobalt, vanadium, gallium, manganese, tin, indium or mixtures thereof. The magnesioferrite and second spinel contain MgO as the predominant bivalent metal oxide in such complex spinels. The crystal agglomerates, or aggregates, contain on the fired basis at least 10% of magnesium oxide crystals; and they contain at least 50% of spinels, including the magnesioferrite and the second magnesia spinel. The product does not contain over 2.0% of lime, CaO, on the fired basis. The magnesioferrite is present in the amount of from 10% to 90%, and the second magnesia spinel in the amount of from 10% to 90%, of the total weight of the spinel component of the crystal agglomerate.

The periclase crystals of the agglomerate can be obtained by heating a magnesium compound which forms periclase upon firing, for example, magnesium hydroxide, natural or artificial, magnesite, magnesium carbonate, bicarbonate or basic carbonate, magnesium alcoholate, magnesium chloride or sulfate or other water-soluble magnesium salt, incompletely crystallized magnesium oxide, hardburned magnesia, periclase, etc. The magnesium hydroxide can be prepared, for example, by burning magnesium metal and hydrating the oxide so formed, but more economically, it is obtained by reacting a magnesium salt solution or brine with an alkali such as caustic soda, lime, calcined dolomite, either in dry or hydrated slurry form, to precipitate $Mg(OH)_2$ and then washing and preferably separately recovering the latter. The magnesium compound starting material is of such purity that the final product prepared according to the invention contains not over 2.0% CaO. In some embodiments, the silica content is preferably also low.

The starting materials for the magnesia spinel component can be a spinel or a metal oxide adapted to form a spinel with magnesia. For instance, as an iron-oxide yielding material, or a material yielding iron oxide upon firing, there can be employed iron oxide, mill scale, pyrite sinter, magnetite, hematite, siderite, limonite. Iron ores so high in sulfur and phosphorus as to be unsuitable for making iron and steel can be employed in the present invention. As a material providing chromium oxide there can be employed chromium oxide, magnesium chromate, ammonium chromate, chromic acid, or more economically, many varieties of chromite ores, including the friable chromites which have hitherto been considered very poor sources of chromite grains themselves. Other chromite ores not suitable for refractory use and not high enough in $Cr_2O_3$ value to be desirable for chemical or metallurgical use, can be employed in the present invention. As materials providing the alumina component of the spinels there can be employed bauxite, diaspore, hydrargillite, laterite, chromite, aluminum hydroxide, alumina or alumina hydrate. Salts of iron, or of chromium, or of aluminum, or mixtures thereof, which are soluble in water or the mixing liquid can be employed. Any desired mixtures of starting materials can be employed.

In addition to the above-mentioned examples of starting materials there are, of course, numerous ores or concentrates thereof which are suitable sources of two or more of the desired components. For example, iron oxide and manganese oxide can be supplied by addition of manganiferous iron ore such as certain magnetite deposits; iron oxide and titanium oxide can be supplied by magnetite-ilmenite ores or by concentrates of certain black beach sands which contain magnetite and ilmenite and which often contain chromite also, thereby providing chrome and alumina as well. Certain laterites, preferably those low in silica, can be employed as a source of iron oxide as well as alumina. Breunnerite can be employed to provide magnesia and a portion of the iron oxide.

The amount of lime, CaO, present in the starting materials or mixture to be fired should be limited so that the final fired product will contain not over 2.0% CaO. The CaO forms with silica, iron oxide or alumina lower melting components such as the silicates, ferrites, aluminates and aluminoferrites which deleteriously affect the refractoriness of the final product. Where highest load strengths are desired over the whole range of firing temperatures, silica is desirably kept as low as possible, preferably not over 5%; but the silica, when the product is fired quite to equilibrium, tends to form, with excess magnesium oxide, magnesium orthosilicate, especially when lime and alkali are limited as described. Alkali content is preferably not over about 1.0%, calculated as the oxide, for example, sodium or potassium oxide. These values are expressed on the fired basis.

The product of this invention is an agglomerate of associated or intergrown periclase and magnesia spinel crystals, in uniform interdispersion wherein the grain or fragment is a composite structure containing both varieties of crystals, the magnesia spinel crystals always including magnesioferrite being present in predominant amount. The magnesioferrite comprises from 10% to 90% of the total spinel component. The spinels constitute a group of double oxides of the general formulae, $AB_2X_4(AX \cdot B_2X_3)$ or $A_2CX_4(2AX \cdot CX_2)$, where A is a divalent metal, B is a trivalent metal, C is a metal in quadrivalent state and X is oxygen; and $B_2X_3$ is a sesquioxide of a spinel-forming metal. These multiple oxides, or spinels, crystallize in the isometric system, and generally display an octahedral or dodecahedral crystal habit.

The starting materials are admixed in very finely divided form, or as intimate interdispersions. This can be accomplished in any desired manner. For example, solutions of the starting materials in a mixing liquid, for instance water, can be mixed together and then dried, or the desired components can be precipitated from the mixed solution. In another mode of procedure, some of the starting materials can be mixed together and then admixed or nodulized with addition of a solution of other starting materials or other forms or compounds of the dry starting materials. The starting materials, where in solid form, should be reduced to finely divided state, preferably to a particle size substantially entirely less than 149 microns in diameter. The starting materials, if desired, can be ground separately and then mixed; or they can be ground together. Improved results are obtained as the materials are more finely divided and preferably the materials are predominantly less than 44 microns in diameter, and with a substantial portion, at least 10%, less than 10 microns in diameter. Excellent results are obtained by starting with precipitated materials such as precipitated magnesium hydroxide or carbonate or basic carbonate. Two or more of the starting materials can be co-precipitated, for example, magnesium hydroxide and iron hydroxide or manganese hydroxide or all three.

The intimately mixed starting materials are then heated to effect combination, crystallization or recrystallization. The mixture can be prepared in the form of a water slurry, introduced into a kiln, such as a rotary kiln, and fired; or dry mixtures can be formed into shapes, such as briquettes, nodules, pellets or the like and fired. The mixtures are preferably fired at a temperature of at least 1600° C., and improved results are obtained by firing at a temperature of at least 1700° C. However, the firing procedure is a function of both time and temperature, and equivalent results can be obtained by firing at a lower temperature for a longer time and at a higher temperature for a shorter time.

It is an advantage of the process of this invention that composite refractory grains are produced which have high refractoriness, high hot load strengths, and resistance to chemical attack at elevated temperatures. It is a further advantage that refractory articles made from the grain materials of this invention exhibit excellent resistance to thermal spalling. It is a particular advantage of the procedure according to the invention wherein an iron oxide, or mill scale, is admixed as a starting material, that this oxide acts as a mineralizer, promoting rapid and complete crystallization of the components of the mix.

The mode of carrying out the process of the invention and products produced thereby will be more clearly explained by the examples set forth below. Table I shows starting mixes made according to the process of the invention, and the porosities of the fired products.

*Table I*

| Test No. | Chromite, percent | Iron Oxide, percent | MgO, percent | Bond | Porosity |
|---|---|---|---|---|---|
| 1 | 25 P | 25 S | 50 H | | 7.2 |
| 2 | 25 P | 25 S | 50 active (oxide). | | 5.5 |
| 3 | 33.1 P | 33.1 S | 33.1 Hb | FeSO$_4$ | 10.7 |
| 4 | 33.1 P | 33.1 S | 33.1 A | FeSO$_4$ | 11.0 |
| 5 | 33.1 T | 33.1 M | 33.1 Hb | FeSO$_4$ | 5.7 |
| 6 | 32.7 P | 32.7 S | 32.7 H | FeSO$_4$ (1.9%) | 5.5 |
| 7 | 14.7 P | 34.2 S | 49.0 H | FeSO$_4$ | 5.9 |
| 8 | 75.0 P | | 25.0 H | | 7.0 |

In the above table, P is Philippine chromite, the analysis of which shows 5.6% $SiO_2$, 15% $Fe_2O_3$, 31% $Cr_2O_3$, 27% $Al_2O_3$, 1.1% CaO, 20.3% MgO; and T is Transvaal chromite, the analysis of which shows 2.2% $SiO_2$, 24.5% FeO, 44.4% $Cr_2O_3$, 16.8% $Al_2O_3$, 0.2% CaO, 11.3% MgO; S indicates iron oxide added as pyrite sinter ($Fe_2O_3$) and M as mill scale ($Fe_3O_4$); H denotes magnesia added as magnesium hydroxide, Hb is crystallized or hardburned magnesia, A, as active magnesia. In the above test series, the solid starting materials providing chromium, aluminum and iron, that is the chromite and iron oxide, are ground in a ball mill to pass a 100 mesh screen (149 microns opening) and active and crystallized magnesias are ground to the same fineness. In test No. 1, the finely ground chromite and iron oxide (as pyrite sinter) are added to magnesium hydroxide sludge (in an amount corresponding to 50% MgO), the mass thoroughly mixed, dewatered and fired. In test No. 2, the ground ingredients are thoroughly mixed together, pressed and fired. In test Nos. 3 and 4, the finely ground materials are thoroughly intermixed and then nodulized in a drum nodulizer while spraying with a water solution providing 0.7% ferrous sulfate in the total dry mix. The nodules so formed are dried and fired. In test No. 5, the dry ingredients are mixed, tempered with a water solution of ferrous sulfate (0.7% of total dry mix), pressed and fired. In test Nos. 6 and 7, the magnesia is added in the form of magnesium hydroxide sludge, the chromite, ferrous sulfate (1.9%) and pyrite sinter admixed therewith, the mix dewatered, and the whole pressed into shape and fired. In test No. 8, the chromite is mixed with the magnesia as magnesium hydroxide sludge, the whole calcined to approximately 1100° C., the calcine compacted by pressing and fired. Firing temperatures in these tests are from about 1600° C. to about 1750° C. The ferrous sulfate bond addition provides greater strength in the nodules or particles during the firing operation.

The following Table II shows the mineralogical composition of the products obtained by firing the compositions described in the corresponding test numbers in Table I, as calculated.

Table II

| Test No. | Periclase, percent | MgO·Fe₂O₃, percent | MgO·Al₂O₃, percent | MgO·Cr₂O₃, percent | CaO·MgO·SiO₂, percent | 2MgO·SiO₂, percent |
|---|---|---|---|---|---|---|
| 1 | 37.4 | 33.4 | 11.6 | 9.8 | 4.4 | 3.3 |
| 2 | 37.4 | 33.4 | 11.6 | 9.8 | 4.4 | 3.3 |
| 3 | 18.2 | 44.4 | 15.1 | 13.0 | 2.2 | 6.7 |
| 4 | 18.2 | 44.4 | 15.1 | 13.0 | 2.2 | 6.7 |
| 5 | 16.1 | 54.5 | 7.9 | 18.5 | 1.3 | 1.6 |
| 6 | 18.3 | 45.1 | 14.4 | 13.0 | 2.2 | 6.8 |
| 7 | 34.8 | 43.6 | 8.6 | 5.8 | 2.3 | 5.1 |
| 8 | 20.9 | 12.8 | 29.0 | 29.2 |  | 8.1 |

In the mixes prepared as shown in Table I, the alumina component of the final spinel is provided by the chromite starting material, but alternatively alumina can be added as laterite, bauxite, or other aluminum compound. Alternatively also, the spinel mixture, containing from 10% to 90% of magnesioferrite and 10% to 90% of another magnesia spinel can be prepared, then admixed with the desired amount of periclase and the whole heated to form the agglomerated crystal mass or grain material.

As an example of the superior performance and characteristics of the grain material made according to the present invention, a series of batches are prepared containing natural chromite grains or the composite spinel grains of the present invention or mixtures of the two, wherein 65% of the batch comprises these grains of sizes between 4 mesh (4.76 mm. opening) and 40 mesh (0.42 mm. opening), and 28.5% of the batch comprises periclase passing 20 mesh (0.84 mm. opening) and 85% of this portion passes 100 mesh (0.149 mm. opening), 3.5% is amorphous silica predominantly finer than 1 micron (volatilized silica), and 3.0% is 24° Bé. aqueous magnesium chloride solution. The batch is mixed, pressed into bricks and dried. Spalling, shrinkage, iron oxide swelling and hot load strength characteristics are investigated. Table III shows the results of these investigations. In the table, the numbers in the "Batch" column indicate that grains of these test numbers (see Table I) are employed in the fractions as described above, C indicates natural chromite grains (Philippine chromite), and R, S and T are representative commercially available bricks of comparable composition made from natural chromite, R and S being chemically bonded and T being pre-fired.

Table III

| Batch | Hot Load, °C. | Spalling, Percent | Iron Oxide Test | |
|---|---|---|---|---|
| | | | Vol. change | Cracking |
| 1 | 1,670 | 2.1 | | |
| 2 | 1,630 | 3.6 | | |
| 4 | 1,610 | 2.8 | Slight change | No cracks. |
| 5 | | 5.5 | | |
| 25% 5–75% C* | 1,650 | 5.2 | Slight shrinkage | Do. |
| 50% 5–50% C** | | 3.1 | | |
| 6 | 1,650 | 6.7 | No change | Do. |
| 7 | 1,700 | 8 | Moderate shrinkage. | Do. |
| C | 1,690 | 5.9 | Moderate swelling. | Cracked. |
| R | | 7.7 | Bad swelling | Do. |
| S | 1,570 | 6.3 | ___do___ | Do. |
| T | 1,710 | 30.0 | Brick broke into separate pieces. | |

*Composed of 25% of grains of Test 5 (Table I) and 75% of natural Philippine chromite grains.
**Composed of 50% of grains of Test 5 (Table I) and 50% of natural Philippine chromite grains.

In Batches 1 to 7, after firing, the iron oxide remained in the pocket as described below, whereas in C, R, S and T, the iron oxide had been absorbed.

While the above example of a refractory batch employing the grains of the present invention relates to a batch containing predominantly grains of the spinel type and a minor portion of periclase grains, other proportions can be employed. For example, the spinel grains of this invention can be employed alone, or if desired, with natural chromite grain admixtures, and in grain sizing ratios known to the art, or the spinel grains can be employed in batches where periclase grains are employed as the major component by weight. Other bonds as commonly employed, or known to the art, can be employed with the grains of this invention. The products of this invention are also useful as bonding materials for various nonacid grains.

In Table III, the "hot load" test represents the temperature at which a piece bearing a load of twenty-five pounds per square inch fails by shear. In the spalling test, bricks of the test batches are laid as stretcher courses in a panel and the face to be tested is placed in front of an open testing furnace for a sufficient time to raise the hot face temperature of the panel to 1600° C. The panel is then removed from the heat source and blasted with cold air for ten minutes. Then alternate heating to 1600° C. in twenty minutes and air blasting for ten minutes are repeated to make a total of ten cycles. The spalling loss is determined after cooling as the percent by weight of the total brick which can be broken off by the fingers aided by only gentle tapping. In testing the effect of iron oxide, depressions 2.25 inches in diameter by 0.5 inch deep are formed in one face of each half of a test brick 9 x 4½ x 3 inches in size. The bricks are cut in half (4½ x 4½ x 3 inch pieces), each containing one pocket or depression, which is then filled with 100 grams of iron oxide, such as mill scale, and the whole then fired to 1650° C. for two hours. Linear change of the face of the piece containing the iron oxide and of the opposite face are then measured, to determine relative change. Porosity is measured as follows: Bulk density of grains of the size fraction between 6 mesh (3.36 mm. opening) and 10 mesh (2.00 mm. opening) is determined, and the true specific gravity, both expressed in grams per cc., of the same fraction is then determined; and porosity is expressed as 100 times the difference between specific gravity and the bulk density, divided by the specific gravity.

The process is of particular advantage in that it enables use of chrome ores which would ordinarily not be useful for refractory products because of excessive tendency to swell in the presence of iron oxide and because of undue friability or tendency to break down into undesirably small particles. The small particles can be reconstituted as to their mineral composition, and formed into grains of desirable size by the present process. It is especially advantageous that the present process provides a means for varying the characteristics of the predominantly spinel grain, depending upon the use for which it is intended. For instance, alumina-bearing spinels are more stable toward iron oxide swelling than chrome spinels, and more stable toward reducing conditions than magnesioferrite, and maintenance of at least 5%, of the total grain, of magnesium aluminate (MgO·Al₂O₃) provides the desirable stability. The magnesioferrite component as disclosed above provides a dense grain and high refractoriness, and also favorably affects resistance to iron oxide swelling. It is especially advantageous in some instances, where chromite is employed as the spinel-forming component, to admix also, as substitute for a portion of the chromite, from 5% to 50% thereof of an iron oxide-yielding material, calculated as Fe₂O₃, to promote reaction and crystallization. The magnesiochromite components provide increased resistance to chemical attack. The addition of magnesioferrite and at least one other magnesia spinel provides excellent density, stability toward iron oxide and one or more of the other mentioned advantages. Addition of iron oxide in the mixtures is especially advantageous in providing a product having low porosity. In the product of this invention, the periclase and spinels can be partially in mutual solid solutions.

Alternatively to the above described firing procedure, products of still lower porosity can be obtained by calcining a mixture of starting materials to an intermediate temperature, that is, to a state of incomplete reaction or incomplete crystallization, then pressing the calcined mixture and firing the pressed mass. Such intermediate calcining temperatures can be, for example, 800° C. to 1200° C. for not over about an hour; although calcining at a lower temperature for a longer time or at a higher temperature for a quite short time is suitable. This calcining and firing procedure is useful in some instances to produce larger grains or denser pieces. According to this invention the mass is fired without general fusion. The crystals in the present agglomerates are generally smaller than crystals produced by fusion, and it is believed that this circumstance may be the reason for the improved spalling resistance of the refractories made from these agglomerates.

In conformity with common practice in reporting chemical analyses of refractory materials, in the specification and claims the proportion of the various chemical constituents present in the material are given in some instances as though these constituents were present as the simple oxides. Thus, the lime is reported as CaO; silicon, as silica, $SiO_2$, magnesium as magnesium oxide, MgO, although the silica and lime may be present in combination with each other or with a small amount of MgO. For example, the term "2.0% CaO" is intended to mean that a chemical analysis of the material referred to would show the Ca content as 2.0%, expressed as CaO, although all the calcium might be present as calcium silicate or in some other combined form. The spinel analysis are expressed or calculated as simple double oxides, although the oxides may also be present as complex spinels or as solid solutions. Thus, the magnesium chromite is expressed as $MgO \cdot Cr_2O_3$, although a minor amount of MgO can be replaced by another bivalent metal oxide, such as FeO, and a minor amount of the $Cr_2O_3$ can be replaced by another oxide of a spinel-forming metal having a valence greater than two, as described above. The product consists essentially of intergrown crystals of periclase, magnesioferrite and at least one other magnesia spinel, in the ratios described. The term "periclase" as used herein indicates magnesium oxide, MgO, crystals. The term "chromite" designates chromium ore. In the specification and claims, percentages are expressed by weight except as to porosity or where otherwise indicated. The mesh sizes given herein are according to United States Standard series.

Having now described the invention, what is claimed is:

1. Refractory batch consisting essentially of an iron oxide-yielding material in an amount to provide at least 5% calculated as magnesioferrite spinel upon firing, a second material adapted to react with magnesia to form a second magnesia spinel in an amount to provide at least 5% calculated as said second magnesia spinel, and a magnesium compound yielding periclase upon firing in an amount to react with said iron oxide-yielding material and said second material to form said spinels and to provide from 10% to 50% periclase, said iron oxide-yielding material, said second material and said magnesium compound being of particle size less than 149 microns diameter, said batch containing not over 2.0% CaO.

2. Nonfused crystalline refractory material consisting essentially of agglomerated, uniformly interdispersed, intergrown crystals of periclase, magnesioferrite and at least one second magnesia spinel, in amounts calculated as at least 10% of periclase crystals and at least 50% of said magnesia spinels, including from 10% to 90% of said spinels calculated as magnesioferrite and from 10% to 90% of said spinels calculated as said second magnesia spinel, said material containing not over 2.0% CaO.

3. Agglomerate as in claim 2 wherein a minor portion of the magnesia of said spinels is replaced by another spinel-forming oxide of a bivalent metal.

4. Nonfused crystalline refractory material consisting essentially of agglomerated, uniformly interdispersed, intergrown crystals of periclase, magnesioferrite and magnesiochromite, in amounts calculated as at least 10% periclase crystals and at least 50% of said magnesia spinels and including from 10% to 90% of said spinels calculated as magnesioferrite and from 10% to 90% of said spinels calculated as magnesiochromite, said material containing not over 2.0% CaO.

5. Nonfused crystalline refractory material consisting essentially of agglomerated, uniformly interdispersed, intergrown crystals of periclase, magnesioferrite, magnesiochromite and magnesium aluminate, in amounts calculated as at least 10% periclase and at least 50% of said magnesia spinels, including from 10% to 90% of said spinels calculated as magnesioferrite, said agglomerate containing not over 2.0% CaO.

6. Nonfused crystalline refractory material consisting essentially of agglomerated uniformly interdispersed, intergrown crystals of periclase, magnesioferrite and at least one second magnesia spinel, in amounts calculated as at least 10% periclase and at least 50% of said magnesia spinels, including from 10% to 90% of said spinels calculated as magnesioferrite and from 10% to 90% of said spinels calculated as said second spinel, said material containing not over 2.0% CaO and not over 5.0% $SiO_2$ 7. Product as in claim 6 wherein said second spinel is magnesiochromite.

8. Product as in claim 6 wherein a minor portion of the magnesia of said spinels is replaced by another spinel-forming oxide of a bivalent metal.

9. Process for making a refractory material which comprises intimately admixing a finely divided iron oxide-yielding material in an amount to provide at least 5% calculated as magnesioferrite on the fired basis at least one other finely divided material providing upon reaction with MgO at least 5% calculated as a second magnesia spinel, and a finely divided periclase-yielding magnesium compound in an amount to react completely with said iron oxide-yielding material and said other material to form magnesia spinels and to provide from 10% to 50% periclase, said magnesia spinels comprising at least 50% of the total weight of the refractory material, said refractory material containing a total of not over 2.0% CaO on the fired basis, said materials being admixed in water slurry, and drying and firing said slurry at a temperature of at least 1600° C. but without fusion to cause said materials to react to form said spinels, said iron oxide-yielding material, said other finely divided material and said periclase-yielding compound being of particle size substantially entirely less than 149 microns, predominantly less than 44 microns and at least 10% less than 10 microns.

10. Process for making a refractory material which comprises intimately admixing a finely divided iron oxide-yielding material in an amount to provide at least 5% calculated as magnesioferrite on the fired basis, at least one other finely divided material providing upon reaction with MgO at least 5% calculated as a second magnesia spinel, and a finely divided periclase-yielding magnesium compound in an amount to react completely with said iron oxide-yielding material and said other material to form magnesia spinels and to provide from 10% to 50% periclase, said magnesia spinels comprising at least 50% of the total weight of the refractory material, said refractory material containing a total of not over 2.0% CaO on the fired basis, said iron oxide-yielding material, said other finely divided material and said periclase-yielding compound being of particle size substantially entirely less than 149 microns, predominantly less than 44 microns and at least 10% less than 10 microns, forming into shapes and firing at a temperature of at least 1600° C. but without fusion to form said magnesia spinels and periclase.

11. Process for making a refractory material which comprises intimately admixing a finely divided iron oxide-yielding material in an amount to provide at least 5% calculated as magnesioferrite on the fired basis, at least one other finely divided material providing upon reaction with MgO at least 5% calculated as a second magnesia spinel, and a finely divided periclase-yielding magnesium compound in an amount to react completely with said iron oxide-yielding material and said other material to form magnesia spinels and to provide from 10% to 50% periclase, said magnesia spinels comprising at least 50% of the total weight of the refractory material, said refractory material containing a total of not over 2.0% CaO on the fired basis, said iron oxide-yielding material, said other finely divided material and said periclase-yielding compound being of particle size substantially entirely less than 149 microns, predominantly less than 44 microns and at least 10% less than 10 microns, forming into shapes under pressure and firing at a temperature of at least 1600° C. but without fusion to form said magnesia spinels and periclase.

References Cited in the file of this patent

UNITED STATES PATENTS

| | | |
|---|---|---|
| 883,286 | Buchner | Mar. 31, 1908 |
| 2,079,066 | Hartmann | May 4, 1937 |
| 2,311,970 | Seil | Feb. 23, 1943 |
| 2,671,732 | Birch et al. | Mar. 9, 1954 |

FOREIGN PATENTS

| | | |
|---|---|---|
| 11,175 | Great Britain | 1907 |
| 468,456 | Great Britain | 1937 |